(12) United States Patent
Kim et al.

(10) Patent No.: US 7,777,371 B2
(45) Date of Patent: *Aug. 17, 2010

(54) LINEAR DRIVE APPARATUS HAVING CORES AND COILS WHICH ARE POSITIONED ON OPPOSITE SIDES OF THE CORES

(75) Inventors: Houng Joong Kim, Hitachi (JP); Kohji Maki, Hitachi (JP); Hisao Tadokoro, Hitachi (JP); Hideki Shimane, Mito (JP); Hitoshi Shibata, Hitachi (JP); Keijiro Sakai, Kanasago (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/298,747

(22) Filed: Dec. 12, 2005

(65) Prior Publication Data
US 2006/0091736 A1    May 4, 2006

Related U.S. Application Data

(63) Continuation of application No. 10/639,484, filed on Aug. 13, 2003, now Pat. No. 7,004,694.

(30) Foreign Application Priority Data
Nov. 12, 2002    (JP)    ............................. 2002-327669

(51) Int. Cl.
H02K 41/03    (2006.01)
(52) U.S. Cl. .............. 310/12.25; 310/12.26; 310/12.21; 310/12.22
(58) Field of Classification Search ............. 310/12–14, 310/12.18, 12.21, 12.22, 12.25, 12.26; 318/135
See application file for complete search history.

(56) References Cited

U.S. PATENT DOCUMENTS 6,548,920 B2 *   4/2003   Joong et al. .................... 310/12

(Continued)

FOREIGN PATENT DOCUMENTS

JP    2001028875    1/2001

(Continued)

OTHER PUBLICATIONS

Machine translation of JP 2002-027731 (supplied by applicant).*

*Primary Examiner*—Karl I Tamai
(74) *Attorney, Agent, or Firm*—Brundidge & Stanger, P.C.

(57) ABSTRACT

The conventional linear drive apparatus has the problem that in constructing a linear motor of a multiphase structure by connecting a plurality of armature units, the length of the armature becomes longer in proportion to the number of the phases, thus limiting the locations where the apparatus can be installed. The problem is solved by a linear drive apparatus comprising a plurality of armature units 3 formed by a magnetic material on which a conductor coil 4 is disposed, and an armature comprising an arrangement of the armature units 3. The armature units 3 comprise a plurality of opposing portions having opposing magnetic pole teeth. The magnetic pole teeth of adjacent opposing portions are arranged in an interdigitated manner. A secondary member 6 is disposed between magnetic pole teeth of the opposing portions. The armature units 3 comprise the coil 4 arranged on opposite sides thereof in an alternating manner.

4 Claims, 4 Drawing Sheets

U.S. PATENT DOCUMENTS

| | | | |
|---|---|---|---|
| 6,570,270 B2 * | 5/2003 | Takebayashi | 307/81 |
| 6,570,274 B2 | 5/2003 | Kim et al. | 310/12 |
| 7,004,694 B2 * | 2/2006 | Kim et al. | 410/12 |
| 2002/0043879 A1 | 4/2002 | Joong et al. | |
| 2002/0053833 A1 * | 5/2002 | Kim et al. | 310/12 |
| 2005/0029874 A1 * | 2/2005 | Dadd | 310/12 |

FOREIGN PATENT DOCUMENTS

| | | | |
|---|---|---|---|
| JP | 200227731 | | 1/2002 |
| JP | 2002142439 | * | 5/2002 |

* cited by examiner

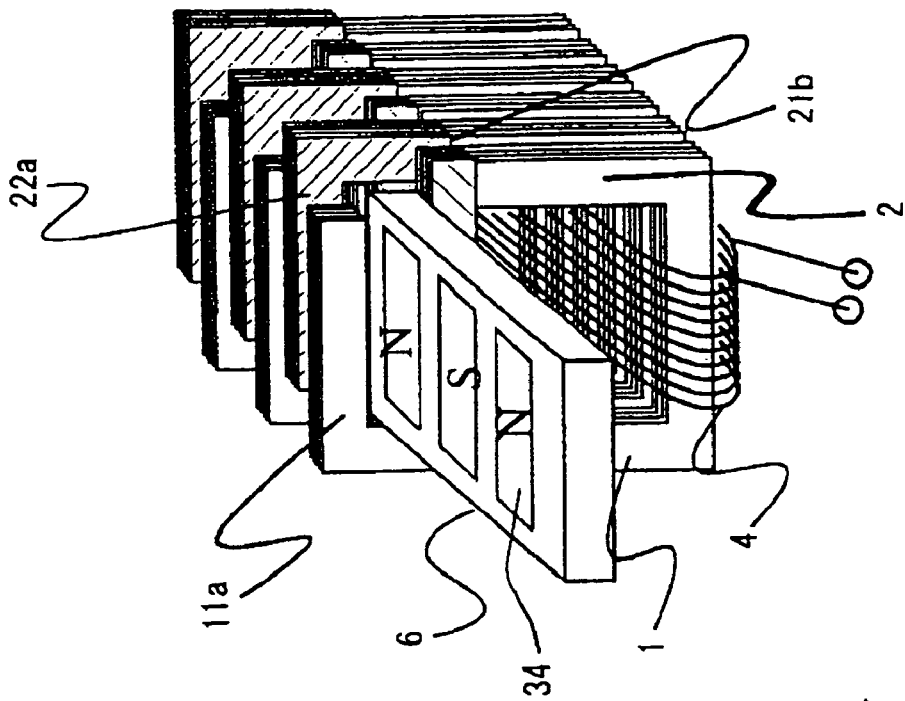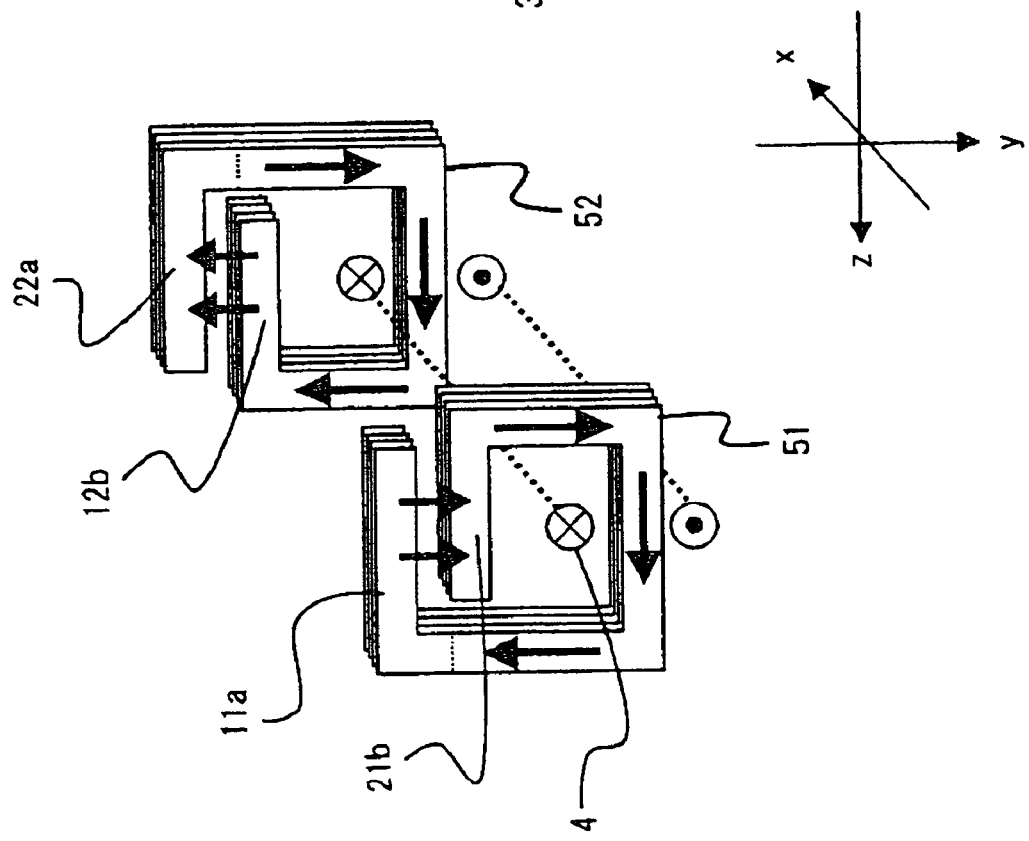

LINEAR DRIVE APPARATUS HAVING CORES AND COILS WHICH ARE POSITIONED ON OPPOSITE SIDES OF THE CORES

The present application is a continuation of application Ser. No. 10/639,484, filed Aug. 13, 2003, now U.S. Pat. No. 7,004,694 the contents of which are incorporated herein by reference.

BACKGROUND OF THE INVENTION

The present invention relates to a drive apparatus driven by electromagnetic force.

In recent years, linear drive apparatus (linear motors) are increasingly employed as the drive source in semiconductor manufacturing equipment. A variety of structures have been proposed for such linear motors. For example, JP Patent Publication (Unexamined Application) No. 2001-28875 (to be hereafter referred to as Prior Art 1) discloses a linear motor that is of a multiphase structure using a single coil in order to facilitate production, attain reduction in size, and improve power efficiency. In this linear motor, the armature comprises cores of two kinds of shapes that are arranged in a manner such that the two shapes alternate.

(Patent Literature 1)

JP Patent Publication (Unexamined Application) No. 2001-28875 (FIG. 4).

In this example, where a plurality of armature units are connected to form a multiphase linear motor, the length of the coil becomes longer in proportion to the number of phases, thus limiting the locations where the motor can be installed.

SUMMARY OF THE INVENTION

It is an object of the invention to provide a linear motor of a multiphase structure whose length is reduced by decreasing the distance between armatures.

In one aspect, the invention provides a linear drive apparatus comprising:

a plurality of armature units each comprising a magnetic material on which a coil made of a conductor is disposed; and an armature comprising the multiple armature units arranged in a row, wherein each armature unit comprises a plurality of opposing portions comprising opposing magnetic pole teeth, the magnetic pole teeth being arranged in an interdigitated manner between adjacent opposing portions, wherein a secondary member is disposed between the magnetic pole teeth constituting the opposing portions, and wherein the armature units comprise coils disposed at at least two locations thereof.

In another aspect, the invention provides a linear drive apparatus comprising:

a plurality of armature units each comprising a magnetic material on which a coil made of a conductor is disposed; and an armature comprising the multiple armature units arranged in a row, wherein each armature unit comprises a plurality of opposing portions each comprising opposing magnetic pole teeth, the magnetic pole teeth being arranged in an interdigitated manner between adjacent opposing portions, wherein a secondary member is disposed between the magnetic pole teeth constituting the opposing portions, and wherein the armature units comprise coils each disposed at one side alternately.

In another aspect, the invention provides a linear drive apparatus comprising:

a plurality of armature units each comprising a magnetic material on which a coil made of a conductor is disposed;

an armature comprising the multiple armature units; and a secondary member comprising a flat board having a plurality of magnets or a flat board made of a magnetic material and having an irregular surface, wherein the armature units comprise first and second magnetic poles, the first magnetic poles having a magnetic pole tooth disposed in one direction and a magnetic pole tooth disposed in another direction from the viewpoint of the secondary member, the magnetic pole teeth being arranged alternately, the second magnetic poles having a magnetic pole tooth disposed in one direction and a magnetic pole tooth disposed in another direction from the viewpoint of the secondary member, the magnetic pole teeth being arranged alternately, wherein the armature units comprise coils each disposed at one side alternately.

Other features of the invention are described in the claims.

BRIEF DESCRIPTION OF THE DRAWINGS

FIGS. 2A and 2B show the structure of a linear motor used in a comparative example.

DESCRIPTION OF THE INVENTION

Figure 3:
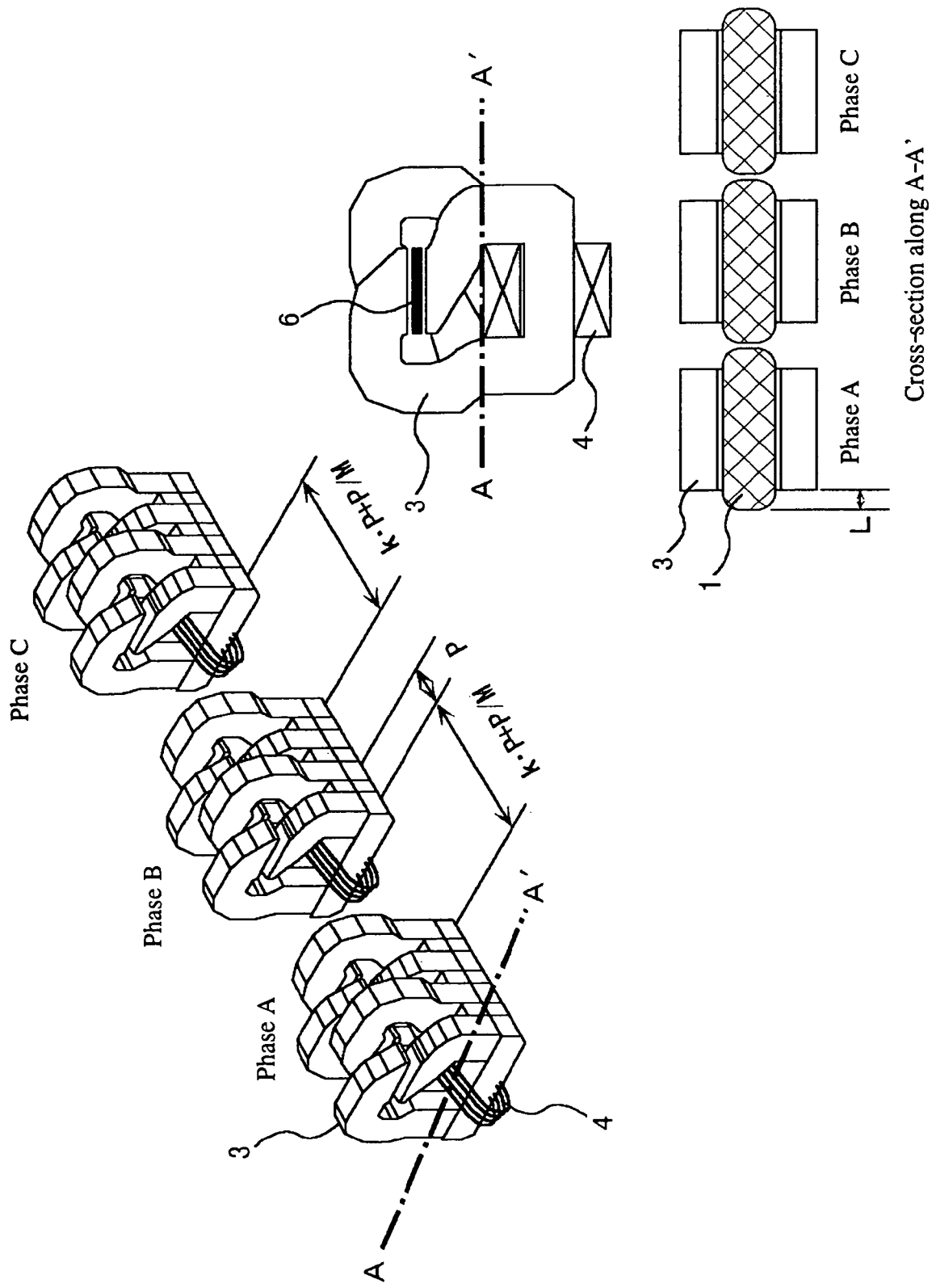
FIG. 3 is an overall view of the linear motor used in the comparative example.

FIGS. 2 and 3 schematically show the structure of a linear motor in a comparative example to illustrate the operation and effects of the invention. FIG. 2(a) illustrates the flow of the magnetic flux in the linear motor. FIG. 2(b) is an overall view of the linear motor. A secondary member of the linear motor is formed substantially in the shape of a flat plate, in which a plurality of permanent magnets 34 are arranged such that their N and S poles alternate. An armature unit 3 constitutes a primary side (comprised of a magnetic material on which a coil is wound) of the linear motor, and it comprises cores 51 and 52, and an armature coil 4 made of a conductor. The coil 4 is disposed at the bottom side of the cores 51 and 52. The cores 51 and 52 are made of a magnetic material. In the armature unit 3, upper and lower magnetic pole teeth are arranged in an interdigitated manner. An upper magnetic pole tooth 11a and a lower magnetic pole tooth 21b of the core 51 are defined as a first opposing portion. A lower magnetic pole tooth 12b and an upper magnetic pole tooth 22a of the core 52 are defined as a second opposing portion. Thus, in the armature 3, a (2n−1)th core forms the first opposing portion and a (2n)th core forms the second opposing portion (where n=1, 2, 3, . . . ). In each opposing portion of the cores 51 and 52, a predetermined gap is provided between the upper pole tooth and the lower pole tooth. As the secondary member 6 is passed through the gap, the secondary member 6 is arranged between the pole teeth 11a and 21b of the first opposing portion and between the pole teeth 12b and 22a of the second opposing portion. As a single-phase AC current is caused to flow in the coil 4 in accordance with the relative position of the secondary member 6 and the armature 3, a magnetic flux flows in the gap between the upper pole tooth and the lower pole tooth of each opposing portion of the linear motor upwards and downwards alternately. The directions of the magnetic flux flowing in the first and second opposing portions are reversed alternately. The magnetic flux flowing in the first and second opposing portions and the magnetic flux created by the permanent magnet 34 act upon one another. This interaction creates an electromagnetic drive force in the secondary member 6 in the direction of x, so that the secondary member 6 executes a reciprocating motion. Magnetic poles 1 on one side of the armature unit 3 comprise first magnetic pole teeth 11a and 12b that are arranged in different directions alternately from the viewpoint of the secondary member 6. Magnetic poles 2 on the other side of the armature unit 3 comprise second magnetic pole teeth 21b and 22a that are also arranged in different directions (upwards and downwards, respectively, in FIG. 2) from the viewpoint of the secondary member 6.

FIG. 3 shows the overall structure of the comparative example. In order to drive the linear motor of the structure shown in FIG. 2 smoothly, a number M (where M is a natural number greater than 1) of M phases of armature units 3 must be arranged in series at such intervals that the distance between the centers of the magnetic pole teeth at the ends of adjacent armature units 3 is more or less k·P+P/M (where k=0, 1, 2, . . . ). In the example of FIG. 3, the number M of phases of the motor is 3, and armature units 3 of phase A, phase B, and phase C are arranged. When the length of a coil end is L, the armature units 3 must be arranged at such intervals that the distance between the pole teeth at the ends of adjacent armature units 3 is at least 2L.

Figure 4:
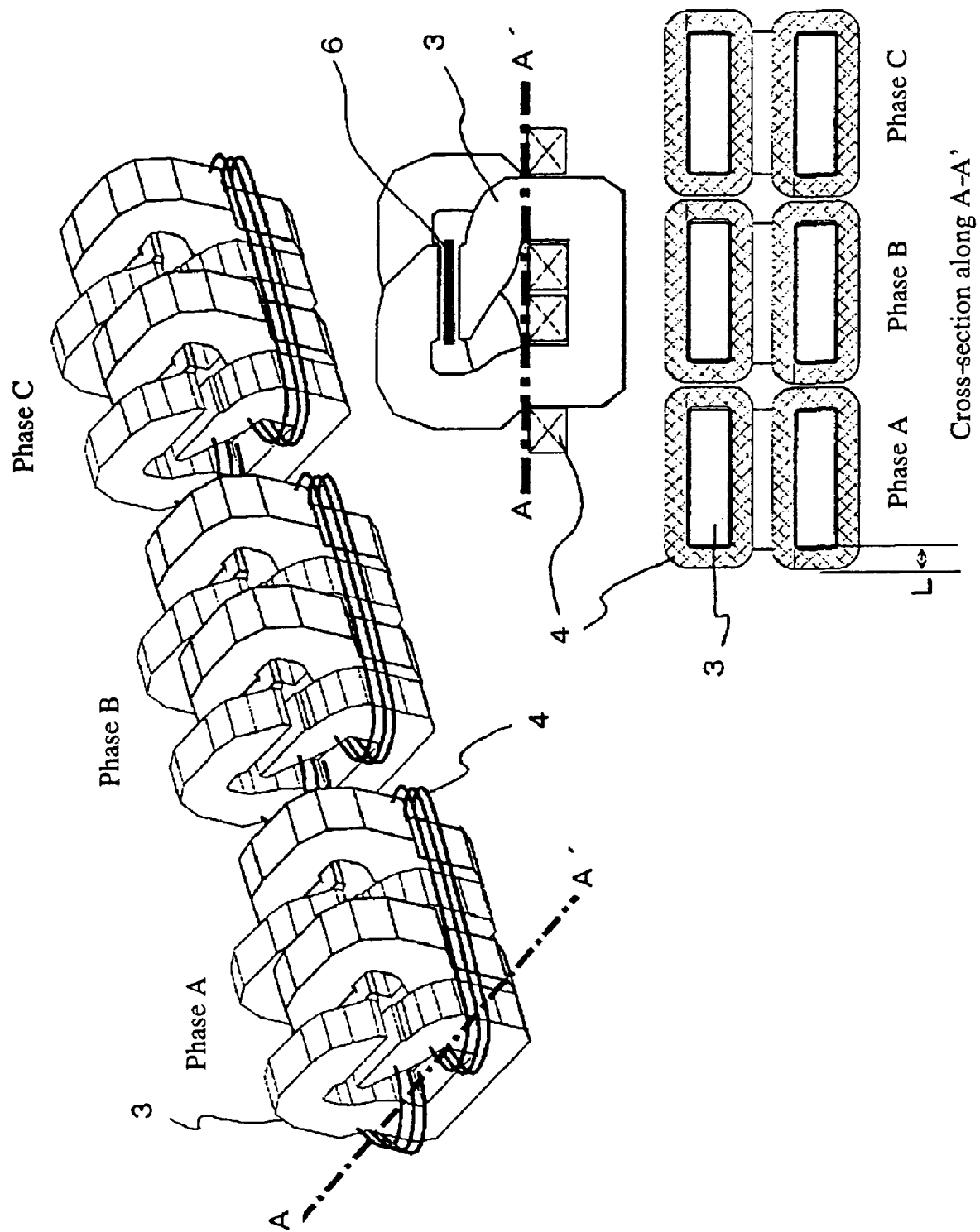
FIG. 4 is an overall view of a first embodiment of the invention.

FIG. 4 is an overall view of the linear motor according to a first embodiment of the invention. This linear motor differs from the comparative example in that a coil 4 is wound at two locations, namely on both sides of the bottom of the magnetic pole teeth of the armature units 3. Because the coil 4 is wound separately at each side of the armature unit, the same number of turns of the coil 4 as in the comparative example can be obtained by winding half the number of turns at each side. Thus, the length L' of the coil end in the present embodiment is half the length L of the coil end in the comparative example. Accordingly, the armature units 3 can be arranged more closely to one another than they are in the comparative example, thus making it possible to reduce the size of the armature as a whole.

Figure 1:
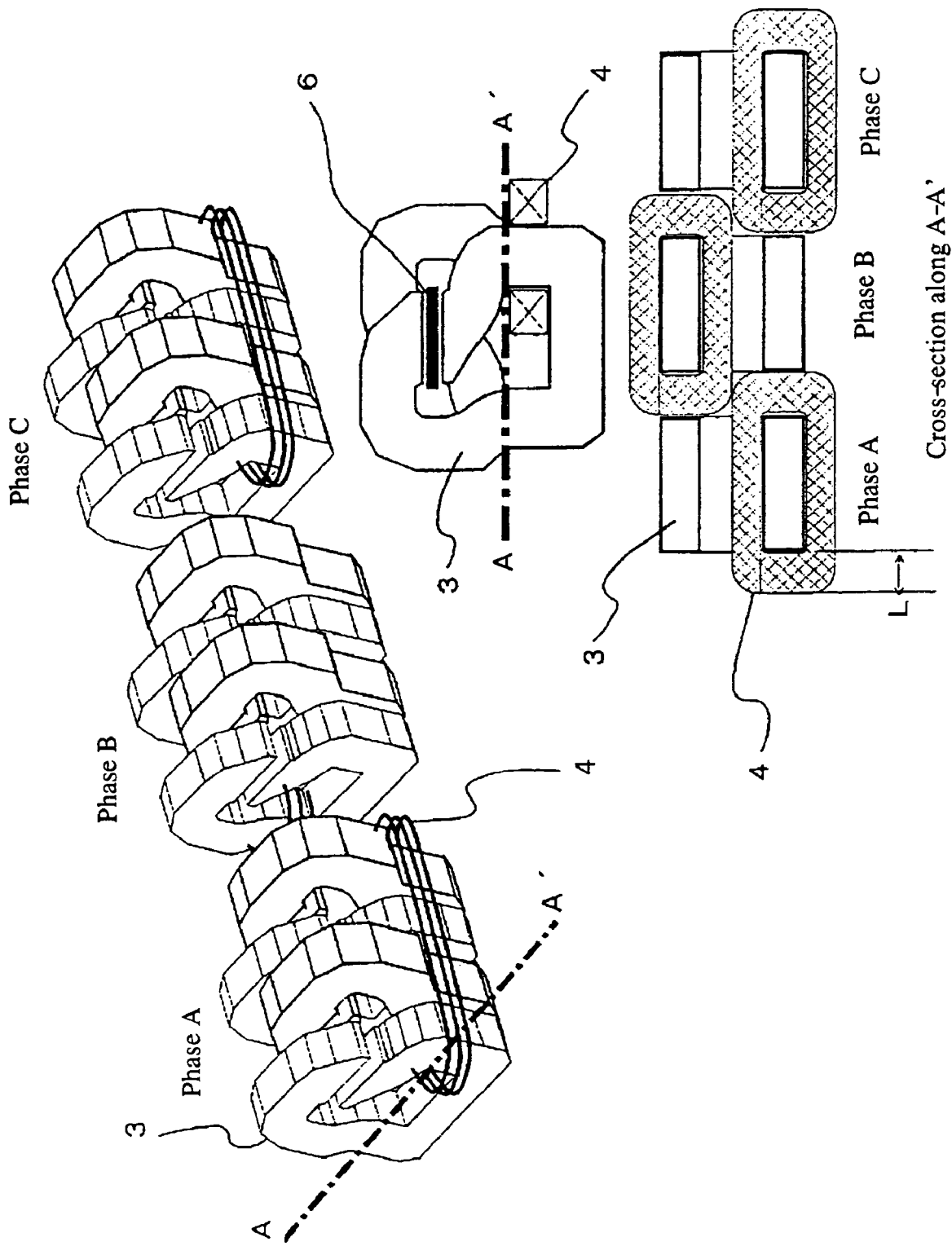
FIG. 1 is an overall view of a second embodiment of the invention.

FIG. 1 shows an overall view of the linear motor according to a second embodiment of the invention. In this embodiment, while it is possible to arrange a coil 4 on either side of an armature unit 3, as in the first embodiment, the coil 4 is disposed at one side of the coil core in each of the adjacent armature units 3 in an alternating fashion. The length L" of the coil end in the present embodiment is substantially the same as the length L in the comparative example. However, because the coils 4 of the adjacent armature units 3 are disposed at opposite sides, the armature units can be arranged more closely than they are in the comparative example, thus making it possible to reduce the size of the armatures as a whole.

While in the first embodiment it is necessary to arrange the coils at two locations in each armature unit 3, in the second embodiment it is only necessary to arrange the coil 4 at one location in each armature unit 3. Thus, the productivity of the armature can be increased while reducing its size, and manufacturing costs can be reduced.

While in the above-described comparative example and embodiments the secondary member 6 is transported, the present invention can be also applied to cases where the armature is transported. Furthermore, while the permanent magnets 34 are disposed in the secondary member 6 in the above example and embodiments, the secondary member 6 may comprise a flat board made of a magnetic material and having an uneven surface, or a flat board made of a conductor.

Thus, in accordance with the invention, the coil is disposed at two locations on either side of the coil portion of the armature unit. Thus the length of the coil end can be shortened and the armature units can be arranged more closely to one another, making it possible to reduce the size of the armatures as a whole.

Further, because the coil is arranged on opposite sides of the core of the coil portion in the armature units alternately, the armature units can be arranged more closely to one another, thus making the armature units compact as a whole. As it is only necessary to arrange the coil at one location in each armature unit, the productivity of the armature can be increased while reducing manufacturing costs.

What is claimed is:

1. A linear drive apparatus comprising:
a plurality of armature units,
wherein each unit armature includes:
a first core having a magnetic material which includes a first opposing portion having an upper magnetic pole tooth and a lower magnetic pole tooth which is opposite to the upper magnetic pole tooth, and
a second core having a magnetic material which includes a second opposing portion having an upper magnetic pole tooth and a lower magnetic pole tooth which is opposite to the upper magnetic pole tooth,
wherein the first and the second cores are arranged alternately with each other, and the magnetic poles of the first and the second opposing portions being in opposite directions;
an armature having the multiple armature units of multiple phases arranged in a row; and
a secondary member being disposed between the magnetic pole teeth constituting each of the opposing portions,
wherein the armature units of multiple phases comprise coils on the opposing portions each disposed at one side alternately.

2. The linear drive apparatus according to claim 1, wherein the coil wound on the armature unit is overlapped with the coil on the adjacent armature unit along the driving direction of the second member.

3. The linear drive apparatus according to claim 1, wherein the secondary member comprises a plurality of permanent magnets.

4. The linear drive apparatus according to claim 1, wherein the distance (D) between the centers of magnetic pole teeth of adjacent armature units of different phases is substantially represented by an equation where:

$$D = k \cdot P + P/M,$$

wherein k is an integer,
wherein M is an integer of at least 1, and
wherein P is a pole pitch of the armature.

* * * * *